Patented Feb. 4, 1930

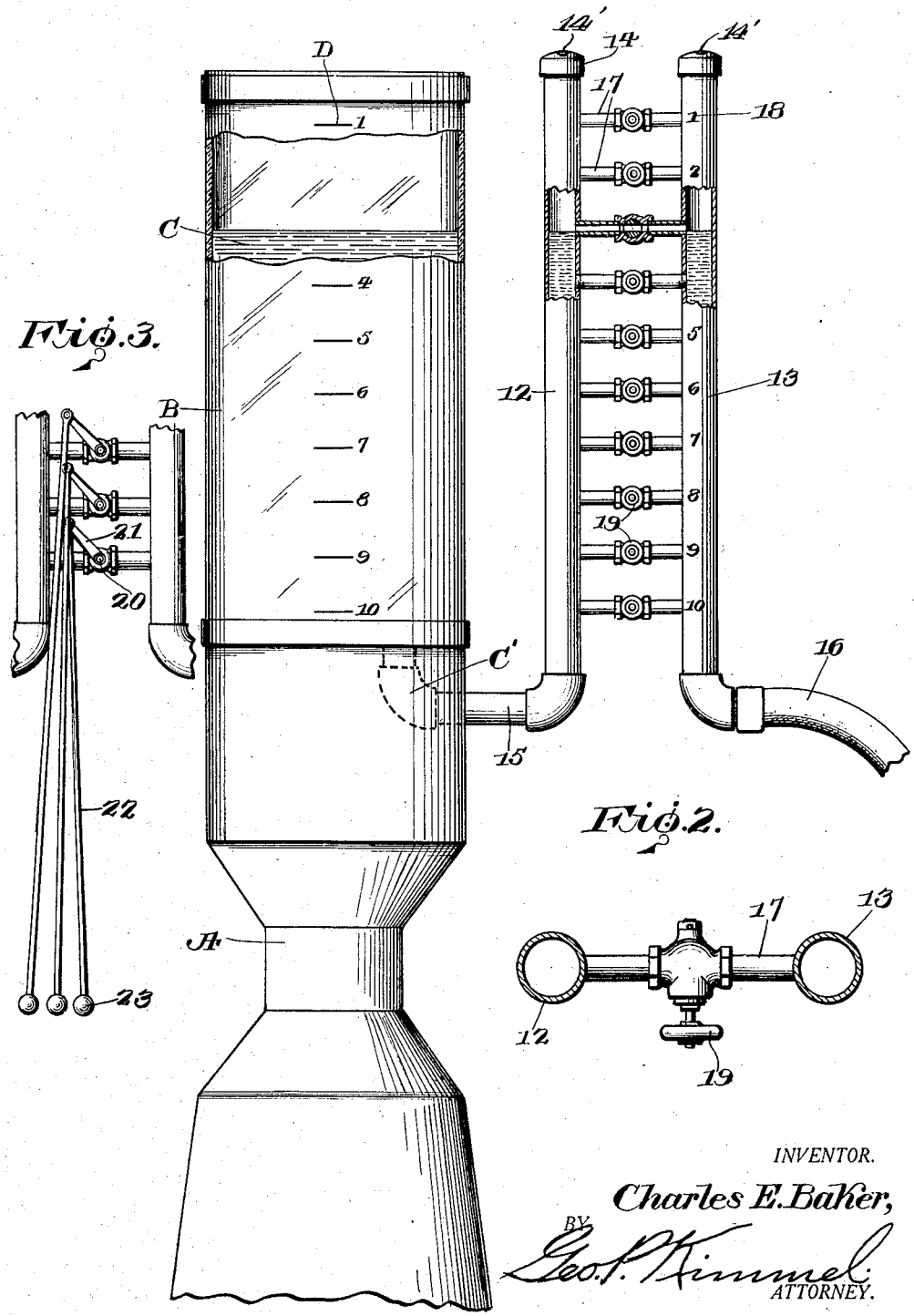

1,745,656

UNITED STATES PATENT OFFICE

CHARLES E. BAKER, OF NEWTON, IOWA

LIQUID-DISPENSING ATTACHMENT

Application filed August 10, 1927. Serial No. 212,045.

This invention relates to a liquid dispensing attachment for liquid measuring pumps, and is designed primarily for use for dispensing gasoline in selective quantities, but it is to be understood that a dispensing attachment, in accordance with this invention, may be employed for any purposes for which it is found applicable, and the invention has for its object to provide, in a manner as hereinafter set forth, a dispensing attachment for selectively, efficiently, accurately and conveniently dispensing a body of liquid in the desired amount from a container forming an element of a measuring pump.

Further objects of the invention are to provide, in a manner as hereinafter set forth, a liquid dispensing attachment which is simple in its construction and arrangement, strong, durable, compact, readily assembled, advantageous in its use, conveniently installed with respect to a liquid measuring pump, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is an elevation, partly broken away, of a measuring pump, showing the adaptation therewith of a liquid dispensing attachment in accordance with this invention and with the attachment partly shown in section.

Figure 2 is a cross sectional view of the attachment.

Figure 3 is a fragmentary view in elevation illustrating a modified arrangement for selectively operating the valves of the dispensing pipes.

The drawings illustrate by way of example, a dispensing attachment in accordance with this invention, constructed to selectively dispense from one to ten gallons of a liquid, or any desired quantity of liquid between one and ten gallons, but it is to be understood that the number of gallons or the capacity of the attachment can be increased or diminished. Preferably the capacity of the attachment will correspond to that of the measuring pump with which the attachment is installed.

Referring to the drawings A indicates a measuring pump provided with a transparent container B for the liquid C. The outer face of the container B is provided with suitable indicia as at D and as illustrated said indicia is for the purpose of indicating measured quantities of the liquid from one to ten gallons or in other words the indicia D provides a measuring scale. The pump A is of any suitable construction and when it is operated to supply the container B with liquid C the amount of liquid, if the container B is filled, will be ten gallons. The container B at its bottom is provided with an outlet pipe C' and which opens into a liquid dispensing attachment, in accordance with this invention.

The apertures in the caps 14 are indicated at 14' and constitute vents. The attachment includes an apertured pair of stand pipes 12, 13 each provided at its upper end with a closure cap 14. The lower end of the stand pipe 12 is in permanent communication with the container B and by a pipe connection 15 with the outlet C. The lower end of the stand pipe 13 has connected therewith the usual rubber hose 16 for supplying the liquid at the point desired. The stand pipe 12 is termed a holder element and the stand pipe 13 a discharge element.

Arranged between the stand pipes 12, 13 is a series of superposed, valved outlet pipes 17 corresponding in number to the number of gallons of liquid which can be supplied to the container B. When the pipes 17 are open communication is established between the stand pipe 12 and the stand pipe 13 so that the liquid can be conducted from the pipe 12 into the pipe 13 and from there discharged through the medium of the hose 16. The stand pipe 13 is provided with suitable means to constitute indicators for the pipes 17, as indicated at 18 and each of said indicators designates a different quantity of liquid for example 18 is for dispensing a gallon of liquid and the other indicators progressively increase to the lower pipe 17 of the series. The indicators 18 correspond to the indicators or indicia provided on the container B and are arranged in alignment therewith.

When the container B is filled with liquid C, the holder element 12 is also filled. Each outlet pipe is independent of the other and each valve of an outlet is independent. Each of the pipes 17 is independently controlled by its valve 19.

Now it will be assumed that the container B has been completely filled with liquid and also the stand pipe 12 and it is desired to dispense three gallons of liquid. The operator will then open the outlet pipe 17 with which the indicator 3 associates and the liquid will pass from the stand pipe 12 into the stand pipe 13 and be discharged from the latter. When the level of the liquid reaches a point whereby the liquid will not pass through the outlet pipe which is open the dispensing action will be stopped. Now it will be assumed that the container B contains but seven gallons of liquid, as three gallons have been dispensed therefrom and a purchaser desires five gallons, then the operator will open the valve 17 of that outlet pipe designated 8 and the desired quantity of liquid will be dispensed. Each outlet pipe 17 provides for dispensing of the required amount of liquid. If the container is completely filled, as well as the stand pipe 12, and the lowermost pipe 17 of the series open, then ten gallons of liquid will be dispensed. The outlet pipes 17 are so arranged relative to the pipes 12 and 13 to provide for dispensing only the desired quantity of liquid and the quantity desired will be accurately measured owing to the manner in which the pipes are set up relative to the stand pipes 12 and 13.

One of the advantages of the attachment is that one attendant can do the work of three, as for example, if the patron calls for seven gallons, the attendant will place the hose 16 in the tank of the vehicle, open pies 17 which is designated by the indicator 7, and step to the next car, and the next. As the attendant does not need to remain at the car and turn the liquid off when the amount desired has been drawn because the dispensing of the liquid discontinues when its level reaches a point where it will not flow through the opened outlet pipe.

Figure 3 illustrates a modified arrangement for selectively operating the valves of the dispensing pipes in lieu of the hand wheels 19; and with reference to Figure 3, each of the valve stems 20, carries at one end a lever arm 21 to which is pivotally connected a pull rod 22 having a knob 23 at its free end. The rods 22 progressively increase in length. When the attachment is positioned at a point above the ground that it may cause considerable inconvenience for the operator to grasp a hand wheel 19, they are removed and the lever and pull rod substituted therefor, and which will provide means within convenient reach of the operator to selectively open and close the valves.

It is thought the many advantages of a liquid dispensing attachment, in accordance with this invention, can be readily understood, and although the preferred embodiment of the invention is as illustrated and described, yet it is to be understood that changes in the details of construction can be had which fall within the scope of the invention as claimed.

What I claim is:

1. A liquid dispensing attachment for use in connection with a liquid measuring pump provided with a liquid container, comprising a vertically disposed holder element for the liquid adapted to be arranged in opposed, spaced relation to such container, a pipe connection leading from the bottom of such container to the lower end of said element for supplying liquid to the latter, a vertically disposed, tubular discharge element for the liquid supplied to the holder element and positioned in opposed, spaced relation to the latter, said discharge element being in free connection to such container and discharging the liquid to be dispensed from its lower end, a conducting hose attached to the lower end of the discharge element, a vertical row of superposed, spaced, parallel, horizontally extending, independent, quantity controlling, liquid dispensing pipes opening at one end into said holder element and at the other end into said discharge element, and a shiftable valve for each dispensing pipe for normally closing the holder element to said discharge element, said valves being independent of each other and further being independently shiftable.

2. A liquid dispensing attachment for use in connection with a liquid measuring pump provided with a liquid container, comprising a vertically disposed holder element for the liquid adapted to be arranged in opposed, spaced relation to such container, a pipe connection leading from the bottom of such container to the lower end of said element for supplying liquid to the latter, a vertically disposed, tubular discharge element for the liquid supplied to the holder element and positioned in opposed, spaced relation to the latter, said discharge element being in free connection to such container and discharging the liquid to be dispensed from its lower end, a conducting hose attached to the lower end of the discharge element, a vertical row of superposed, spaced, parallel, horizontally extending, independent, quantity of controlling, liquid dispensing pipes opening at one end into said holder element and at the other end into said discharge element, a shiftable valve for each dispensing pipe for normally closing the holder element to said discharge element, said valves being independent of each other and further being independently shiftable, and means depending from each valve for independently shifting it.

In testimony whereof, I affix my signature hereto.

CHARLES E. BAKER.